United States Patent
Sigmund

(10) Patent No.: US 8,611,826 B2
(45) Date of Patent: *Dec. 17, 2013

(54) METHOD AND SYSTEM FOR MEASURING CROSS-POLARIZATION ISOLATION VALUE AND 1 DB GAIN COMPRESSION POINT

(75) Inventor: Jesse Paul Sigmund, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/053,707

(22) Filed: Mar. 22, 2011

(65) Prior Publication Data

US 2011/0211704 A1    Sep. 1, 2011

Related U.S. Application Data

(63) Continuation of application No. 11/863,736, filed on Sep. 28, 2007, now Pat. No. 7,929,915.

(51) Int. Cl.
 *H04B 17/00* (2006.01)

(52) U.S. Cl.
 USPC ........... 455/67.11; 455/454; 455/9; 455/63.1; 455/423; 701/207

(58) Field of Classification Search
 USPC ......... 455/67.11, 454, 9, 63.1, 423, 424, 427, 455/422.1; 701/207
 See application file for complete search history.

(56) References Cited

U.S. PATENT DOCUMENTS

| | | | |
|---|---|---|---|
| 4,456,877 A | 6/1984 | Brown | |
| 6,580,391 B1 | 6/2003 | Kepley et al. | |
| 7,929,915 B2 * | 4/2011 | Sigmund | 455/67.11 |
| 2004/0068365 A1 | 4/2004 | Sanchez Peiro | |
| 2004/0106385 A1 * | 6/2004 | Kazakevich et al. | 455/126 |
| 2007/0288208 A1 | 12/2007 | Grigsby et al. | |

* cited by examiner

*Primary Examiner* — Tuan Pham

(57) ABSTRACT

Exemplary embodiments include methods and systems for receiving a signal at a monitoring station, determining a transmit cross-polarization isolation value and/or 1 dB gain compression point based at least in part on the signal having one or more polarities; and outputting at about real-time the determination of the transmit cross-polarization isolation value and/or the 1 dB gain compression point to a user.

19 Claims, 6 Drawing Sheets

METHOD AND SYSTEM FOR MEASURING CROSS-POLARIZATION ISOLATION VALUE AND 1 DB GAIN COMPRESSION POINT

CROSS-REFERENCE RELATED APPLICATION

This patent application is a continuation of U.S. patent application Ser. No. 11/863,736, filed Sep. 28, 2007, entitled "Method and System for Measuring Cross-Polarization Isolation Value and 1 dB Gain Compression Point," to Jesse P. Sigmund, which is hereby incorporated by reference herein in its entirety.

BACKGROUND INFORMATION

Accurate measurement of an antenna located at an earth station may require accurate measurement of a maximum and/or minimum values of cross-polarization isolation and/or a 1 dB gain compression point (P1 dB). The measurement of the cross-polarization isolation value and/or 1 dB gain compression point (P1 dB) may involve manually operating one or multiple spectrum analyzers to observe cross-polarization components and/or co-polarization components of a transmitted signal from an earth station under test (EUT). The cross-polarization isolation value may be calculated by manually measuring the carrier-to-noise ratio from the transmitted cross-polarization component and co-polarization component and performing a mathematical operation to determine the cross-polarization isolation value. The 1 dB gain compression point may be identified by increasing the input power level of the earth station under test (EUT) in 1 dB steps until an increase in the power of the transmitted signal becomes nonlinear with respect to the increase in the input power level. However, known techniques for computing and adjusting for cross-polarization isolation value and 1 dB gain compression point are labor and time intensive and thus fallible. Accordingly, there is a need for more accurate, reliable and efficient systems and techniques for verifying that earth station antenna are optimally aligned and calibrated.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

An exemplary embodiment provides a measuring system and process for performing a cross-polarization isolation measurement and/or a 1 dB gain compression point measurement. For example, the measurement system may be coupled to, integrated and/or otherwise associated with a monitoring earth station system. Also, the measurement system may communicate with a transmitting earth station system and/or a satellite system through a network, such as a wireless network and/or a wired network. Advantageously, the measurement system may provide a user with an accurate and reliable means to calculate the cross-polarization isolation value and/or 1 dB gain compression point. Additionally, the measurement system may enable a user to monitor and/or discern at about real-time a transmitting earth station system located remotely from the monitoring earth station system to achieve an optimal operation at the transmitting earth station system.

The description below describes transmitting/receiving earth stations systems (e.g., very small terminal structure (VSAT) sites), inter-facility links (IFL), antenna shelters, antennas, and other components that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

Figure 1:
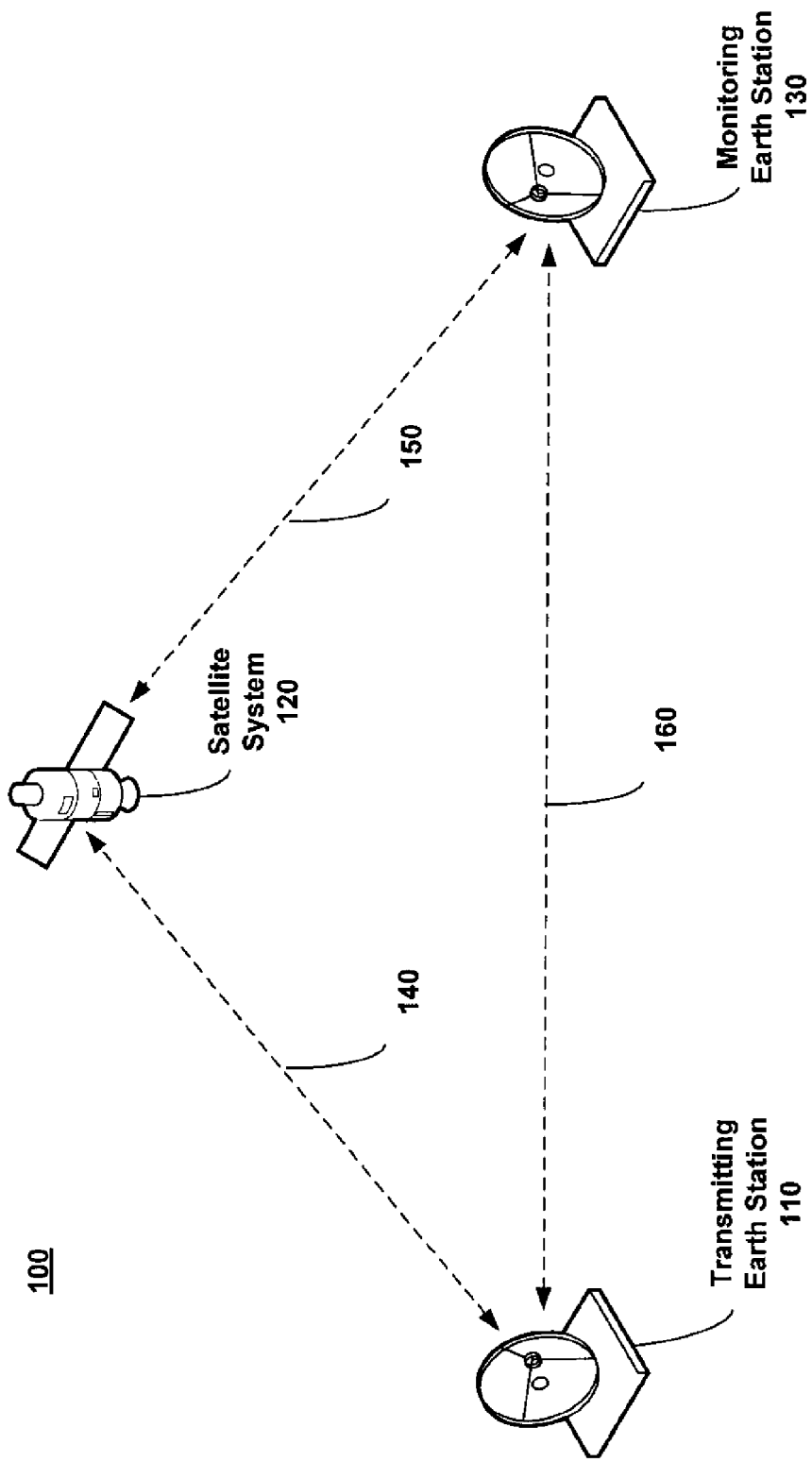
FIG. 1 depicts an exemplary system for performing a cross-polarization isolation measurement and a 1 dB gain compression point, according to an exemplary embodiment.

FIG. 1 is an exemplary measuring system 100 for performing a cross-polarization isolation measurement and/or 1 dB gain compression point measurement, according to an exemplary embodiment. As illustrated, a transmitting earth station 110 may be monitored by a monitoring earth station 130 via a satellite system 120. The transmitting earth station 110 may transmit a polarized signal including a linear polarization signal, a circular polarization signal, and/or an elliptical polarization signal to the satellite system 120 via a transmission path 140. For example, the linear polarization signal may include a horizontal polarity component and/or a vertical polarity component. Also, the circular polarization signal may include right hand circular polarization components and/or left hand circular polarization components. For example, a co-polarization component of the transmitted signal may be associated with the horizontal polarity and/or a cross-polarization component of the transmitted signal may be associated with the vertical polarity component. The satellite system 120 may receive the transmitted signal via one or more transponders associated with the horizontal polarity and/or the vertical polarity. The satellite system 120 may amplify and/or communicate the transmitted signal to the monitoring earth station 130. The monitoring earth station 130 may measure the cross-polarization isolation value and/or 1 dB gain compression point of the transmitting earth station 110. Also for example, the monitoring earth station 130 may directly receive the transmitted signal from the transmitting earth station 110 via a transmission path 160 to determine the cross-polarization isolation value and/or the 1 dB gain compression point.

The transmitting earth station 110 may be an earth satellite station, a teleport, a communication facility and/or other transmitting stations for transmitting a signal. The transmitting earth station 110 may include an outdoor unit (ODU) and an indoor unit (IDU) connected to each other via an inter-facility link (IFL). The outdoor unit (ODU) may include a microwave radio transmitting antenna, a receiving antenna, feedhorn, low-noise block (LNB), block-up converter (BUC), transmit reject filter, transceiver, power amplifier, polarizer, transmit type N transition, transponder and/or other devices located associated with the outdoor unit (ODU). The indoor unit (IDU) may include modems and/or electronic interface to enable a connection to a network (e.g., Internet). The inter-facility network (IFL) may be a wireless network, a wired network or any combination of wireless network and wired network.

The satellite system 120 may include one or more of the following: a space station, a communications satellite, astronomical satellite, biosatellite, miniaturized satellites, navigational satellites, reconnaissance satellites, earth observation satellites, solar power satellites, space stations, weather satellites, anti-satellite weapons and/or other satellites for relaying and/or transmitting a signal.

The transmission paths 140, 150 and/or 160 may be a wireless network, a wired network or any combination of wireless network and wired network. For example, transmission paths 140, 150 and/or 160 may include, without limitation, satellite network operating in Band C, Band Ku and/or Band Ka, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other wireless network for transmitting a signal. In addition, the transmission paths 140, 150 and/or 160 may include, without limitation, telephone line, fiber optics, IEEE Ethernet 802.3, wide area network (WAN), local area network (LAN), global network such as the Internet. Also, transmission paths 140, 150 and/or 160 may enable, a wireless communication network, a cellular network, an Intranet, or the like, or any combination thereof. The transmission paths 140, 150 and/or 160 may further include one, or any number of the exemplary types of networks mentioned above operating as a stand-alone network or in cooperation with each other.

The monitoring earth station 130 may be an earth satellite station, a teleport, a communication facility and/or other stations located remotely from the transmitting earth station 110. The monitoring earth station 130 may include an outdoor unit (ODU) and an indoor unit (IDU) connected to each other via an inter-facility link (IFL). The outdoor unit (ODU) may include a microwave radio transmitting antenna, a receiving antenna, feedhorn, low-noise block (LNB), block-up converter (BUC), transmit reject filter, transceiver, power amplifier, polarizer, transmit type N transition and/or other devices associated with the outdoor unit (ODU). The indoor unit (IDU) may include electronic interface to enable a connection to a network (e.g., Internet). The inter-facility network (IFL) may be a wireless network, a wired network or any combination of wireless network and wired network. Also, the monitoring earth station 130 may include a processing unit to determine the cross-polarization isolation value and/or the 1 dB gain compression point of the transmitting earth station 110.

Figure 2:
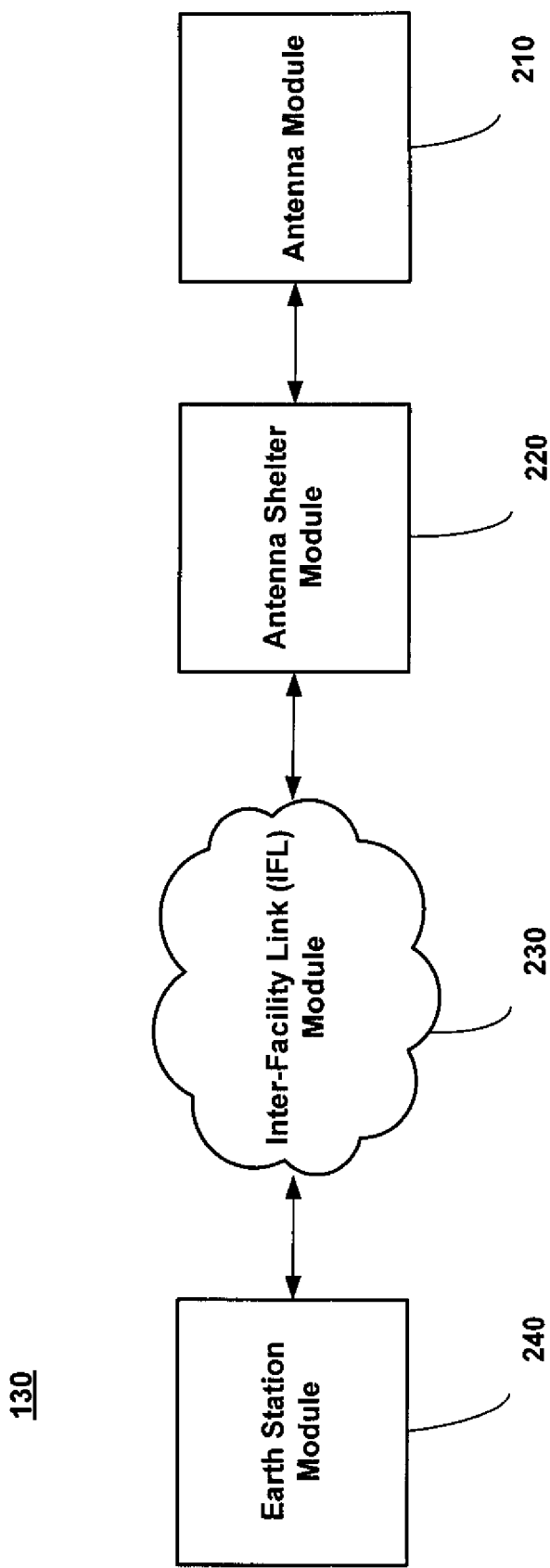
FIG. 2 depicts an exemplary measuring system for measuring a cross-polarization isolation value and a 1 dB gain compression point at an earth station under test (EUT), according to an exemplary embodiment.

FIG. 2 illustrates an exemplary monitoring earth station 130 for monitoring, analyzing, and/or determining a cross-polarization isolation value and/or 1 dB gain compression point, in accordance with an exemplary embodiment. As discussed above, the monitoring earth system 130 may be located remotely from the transmitting earth station 110. Also, the monitoring earth station 130 may include a computer readable media having software code to perform the cross-polarization isolation value measurement and/or the 1 dB gain compression point measurement. The monitoring earth system 130 may include an antenna module 210, an antenna shelter module 220, an inter-facility link (IFL) module 230 and an earth station module 240. The antenna module 210 may receive a transmitted signal from the satellite system 120 and/or the transmitting earth station 110. The antenna module 210 may transfer the transmitted signal to the antenna shelter module 220. The antenna shelter module 220 may detect and/or display various information associated with the transmitted signal. The antenna shelter 220 may transfer the information associated with the transmitted signal to the earth station module 240 via the inter-facility link (IFL) module 230. The earth station module 240 may analyze and/or determine the cross-polarization isolation value and/or 1 dB gain compression point based at least in part on the information associated with the transmitted signal.

The antenna module 210 may include a microwave radio transmitting antenna, a receiving antenna, an isotropic radiator antenna, a dipole antenna, a Yagi-Uda antenna, a loop antenna, a magnetic loop antenna, a large loop antenna, a small loop antenna, an electrically short antenna, a fractal antenna, a parabolic antenna, a micro-strip antenna, a quad antenna, a random wire antenna, a beverage antenna, a helical antenna, a broadside helical antenna, a phased ray antenna, a synthetic aperture antenna, a trailing wire antenna, a dielectric resonator antenna, a feedhorn antenna and/or other antennas for transmitting and and/or receiving a signal The antenna shelter module 220 may include signal dividers, analog spectrum analyzers, digital spectrum analyzers, signal converters, switches, DSL modems, ADSL modem, cable modems, broadband modems, double way satellite modem, power-line modems, ISDN modems, Wi-Fi modems, WiBro modems, WiMax modems, UMTS-TDD modems, HSPA modems, EV-DO modems, satellite modems and/or other devices for detecting and/or displaying a signal.

The inter-facility link (IFL) module 230 may be a wireless network, a wired network or any combination of wireless network and wired network. For example, inter-facility link (IFL) module 230 may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.1n and 802.11g and/or any other communication network for transmitting a signal. In addition, inter-facility link (IFL) module 230 may include, without limitation, co-axial cable, telephone line, fiber optics, IEEE Ethernet 802.3, wide area network (WAN), local area network (LAN), global network such as the Internet. Also, inter-facility link (IFL) module 230 may enable, a wireless communication network, a cellular network, an Intranet, or the like, or any combination thereof. The inter-facility link (IFL) module 230 may further include one, or any number of the exemplary types of networks mentioned above operating as a stand-alone network or in cooperation with each other.

The earth station module 240 may include DSL modems, ADSL modem, cable modems, broadband modems, double way satellite modem, power-line modems, ISDN modems, Wi-Fi modems, WiBro modems, WiMax modems, UMTS-TDD modems, HSPA modems, EV-DO modems, satellite modems, a local area network (LAN), an wide area network (WAN), computer devices, communication devices including, for example, a personal computer (PC), a workstation, a mobile device, a handheld PC, a personal digital assistant (PDA) and/or other devices for receiving and/or processing a signal.

Figure 3:
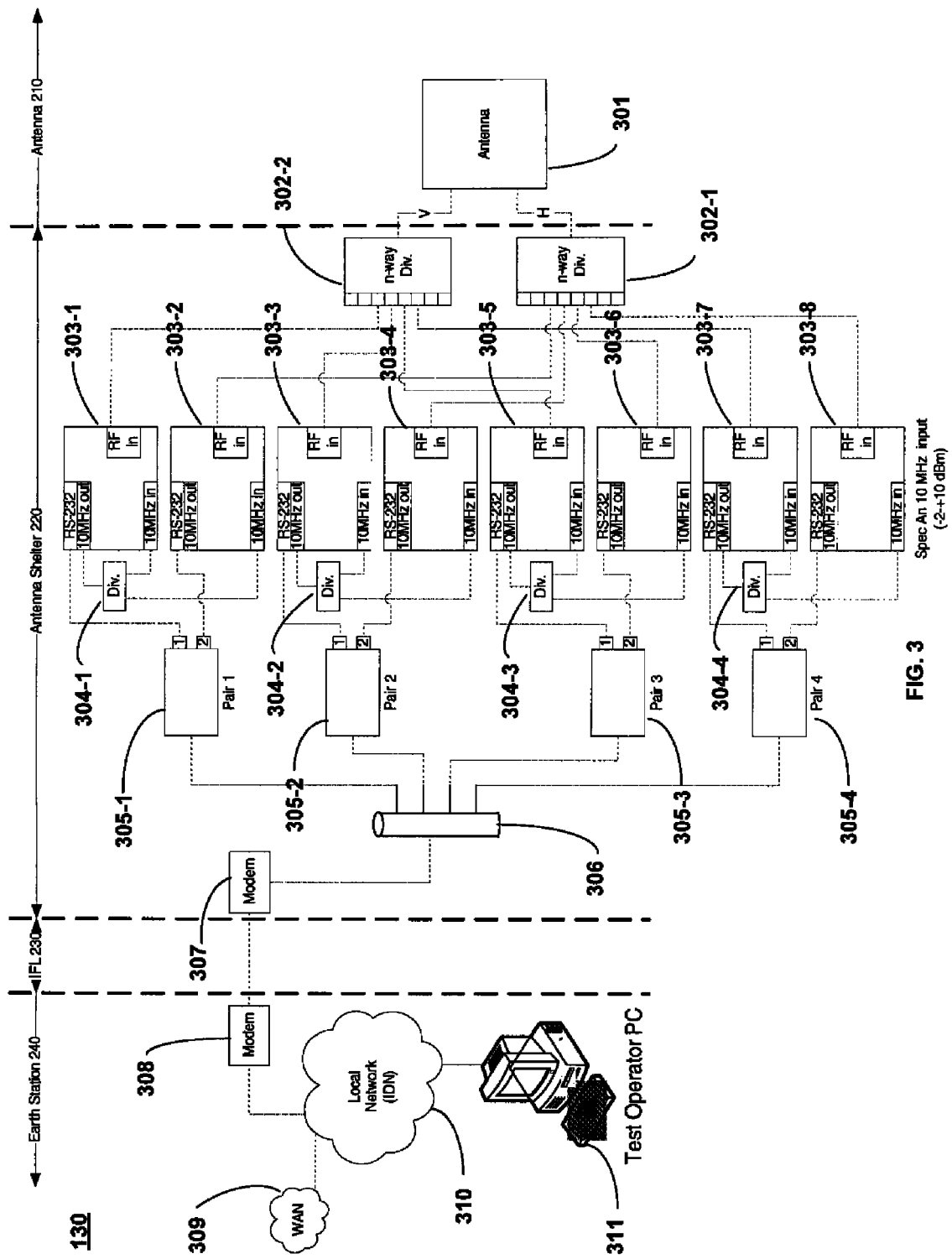
FIG. 3 depicts a detailed schematic of an exemplary measuring system for measuring a cross-polarization isolation value and a 1 dB gain compression point at an earth station under test (EUT), according to an exemplary embodiment.

Referring to FIG. 3, a detailed schematic of the monitoring earth station 130 for monitoring, analyzing, and/or determining a cross-polarization isolation value and/or 1 dB gain compression point, in accordance with an exemplary embodiment. FIG. 3 is a more detailed view of the monitoring earth station 130 illustrated in FIG. 2. As shown, the antenna module 210 may include an antenna 301 and/or other transmitting and/or receiving devices. The antenna 301 may receive a transmitted signal from the transmitting earth station 110 via the satellite system 120. Also, the antenna 301 may receive the transmitted signal directly from the transmitting earth station 110. The transmitted signal may include a horizontal polarity component and/or a vertical polarity component. The antenna 301 may include one or more of transponders associated with the horizontal polarity component and/or the vertical polarity component of the transmitted signal. The one or more transponders associated with the horizontal polarity component of the transmitted signal may be staggered in the frequency spectrum from the plurality of transponders associated with the vertical polarity component of the transmitted signal. A user may select one or more transponders to perform the cross-polarization isolation value measurement and/or the 1 dB gain compression point measurement.

The antenna module 210 may provide the transmitted signal having horizontal polarity components and/or vertical polarity components to the antenna shelter module 220. The antenna shelter module 220 may include two n-way signal dividers 302-1 and 302-2 for receiving the transmitted signal from the antenna module 210. The n-way signal dividers 302-1 and 302-2 may replicate the transmitted signal to n-channels in accordance with the number of spectrum analyzers 303. The n-way signal dividers 302-1 and 302-2 may couple the transmitted signal to one or more spectrum analyzers 303. The number of channels for the n-way signal dividers 302-1 and 302-2 may be associated with the number of transponders associated with the satellite system 120 and/or other design specifications. For example, the n-way signal dividers (broadband divider so you can have more than one spectrum analyzer) 302-1 and 302-2 of the received signal into 4 channels each coupled to the one or more spectrum analyzer 303.

The one or more spectrum analyzers 303 may detect the vertical polarity component and/or the horizontal polarity component of the transmitted signal. The one or more spectrum analyzers 303 may also determine information associated with the vertical polarity component and/or the horizontal polarity component of the transmitted signal. For example, the one or more spectrum analyzers 303 may be divided into pairs of spectrum analyzers 303 to determine information associated with the vertical polarity component and the horizontal polarity component of the transmitted signal. A first pair of spectrum analyzers 303 may include spectrum analyzers 303-1 and 303-2, a second pair of spectrum analyzers 303 may include spectrum analyzers 303-3 and 303-4, a third pair of spectrum analyzers 303 may include spectrum analyzers 303-5 and 303-6 and a fourth pair of spectrum analyzers 303 may include spectrum analyzers 303-7 and 303-8. The information associated the vertical polarity component and/or the horizontal component of the transmitted signal may include frequency, amplitude and/or phase. One or more settings associated with the one or more spectrum analyzer 303 may be adjusted to view the transmitted signal. One or more settings associated with the one or more spectrum analyzers 303 may include center frequency, reference level, span, resolution bandwidth, video bandwidth, and/or other settings to view the transmitted signal, reference level, span, resolution bandwidth, video bandwidth, A user may select a pair of spectrum analyzers 303 to perform the cross-polarization isolation value measurement and/or the 1 dB gain compression point measurement. Also, the first pair of spectrum analyzers 303 may be set as a default pair of spectrum analyzers 303. Furthermore, a predetermined time of inactivity from a user, the spectrum analyzers 303 may terminate a communication with the user.

Signal dividers 304-1, 304-2, 304-3 and 304-4 may be associated with a pair of the spectrum analyzers 303. For example, a spectrum analyzer 303 from a pair of spectrum analyzer 303 may output a reference signal. The output reference signal from the spectrum analyzer 303 may exhibit a predetermined frequency, e.g., 10 MHz. The output reference signal from the spectrum analyzer 303 may be inputted into the signal divider 304. The signal divider 304 may divide the output reference signal into two output reference signals. Each of the output reference signals from the signal dividers 304 may be inputted into the pair of spectrum analyzer 303. The output reference signals from the signal dividers 304 may synchronize the pair of spectrum analyzer 303. By synchronizing the pair of spectrum analyzers 303, the received co-polarization component and the received cross-polarization may be synchronized, e.g., peak at the same frequency. Also, the reference signal may be provided by an external source to the signal dividers 304-1, 304-2, 304-3 and 304-4 in order to synchronize the one or more spectrum analyzer 303.

The outputs of each spectrum analyzers 303 may be inputted into a signal converter 305. As shown in the exemplary embodiment, output of each pair of spectrum analyzers 303 may be inputted into four signal converters 305-1, 305-2, 305-3 and 305-4, respectively. For example, the signal converter 305 may be a serial-Ethernet converter. The signal converter 305 may convert a serial input signal from the spectrum analyzer 303 and output an Ethernet signal.

The output signal from the signal converter 305 may be inputted into a switch 306. As shown, output from each of the four signal converters 305 may be inputted into the switch 306. A user may use the switch 306 to select to view information associated with the transmitted signal from one or more channels. The switch 306 may include an Ethernet switch, a semiconductor switch, an actuator, a changeover switch, knife switch, a single pole, single throw (SPST), single pole, double throw (SPDT), a single pole changeover (SPCO), a double pole, single throw (DPST), double pole, double throw (DPDT), double pole changeover (DPCO), a 4-way switch, a push-to-make switch, a push-to-break switch, a mercury switch, a centrifugal switch, a DIP switch, hall-effect switch, inertial switch, a membrane switch, a toggle switch, a transfer switch, a mindy switch, an intermediate switch, a multi-way switch and/or other switching devices to switch between the one or more channels.

The switch 306 may output a signal from the channel selected by a user to a first modem 307. The first modem 307 may include DSL modems, ADSL modems, cable modems, broadband modems, double way satellite modems, power-line modems, ISDN modems, Wi-Fi modems, WiBro modems, WiMax modems, UMTS-TDD modems, HSPA modems, EV-DO modems, satellite modems and/or other devices for modulating and/or demodulating a signal.

The first modem 307 may transfer the output signal to a second modem 308 via the inter-facility link (IFL) 230. Also, the second modem 308 may include DSL modems, ADSL modem, cable modems, broadband modems, double way satellite modem, power-line modems, ISDN modems, Wi-Fi modems, WiBro modems, WiMax modems, UMTS-TDD modems, HSPA modems, EV-DO modems, satellite modems and/or other devices for modulating and/or demodulating a signal.

The second modem 308 may transfer the output signal to a local area network (LAN) 310. The local area network (LAN) 310 may be a computer network and/or other communication networks. A user may operate a user interface 311 (e.g., computer) to access the signal transferred via the local area network (LAN) 310. The user interface 311 may include a computer readable media having software code to perform at about real-time the cross-polarization isolation value measurement and/or the 1 dB gain compression point measurement. The software code may include platform software, application software, user-written software and/or other software languages to enable the cross-polarization isolation value measurement and/or the 1 dB gain compression point measurement at about real-time.

Also, a wide area network (WAN) 309 may be in communication with the local area network (LAN) 310. A user located remotely from the local area network (LAN) 310 may obtain the output signal from the local area network (LAN) 310 via the wide area network (WAN) 309.

The wide area network (WAN) 309 and/or the local area network (LAN) 310 may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other communication network for transmitting a signal. In addition, the wide area network (WAN) 309 and/or the local area network (LAN) 310 may include, without limitation, co-axial cable, telephone line, fiber optics, IEEE Ethernet 802.3, global network such as the Internet. Also, the wide area network (WAN) 309 and/or the local area network (LAN) 310 may enable, a wireless communication network, a cellular network, an Intranet, or the like, or any combination thereof. The wide area network (WAN) 309 and/or local area network (LAN) 310 may further include one, or any number of the exemplary types of networks mentioned above operating as a stand-alone network or in cooperation with each other.

Figure 4:
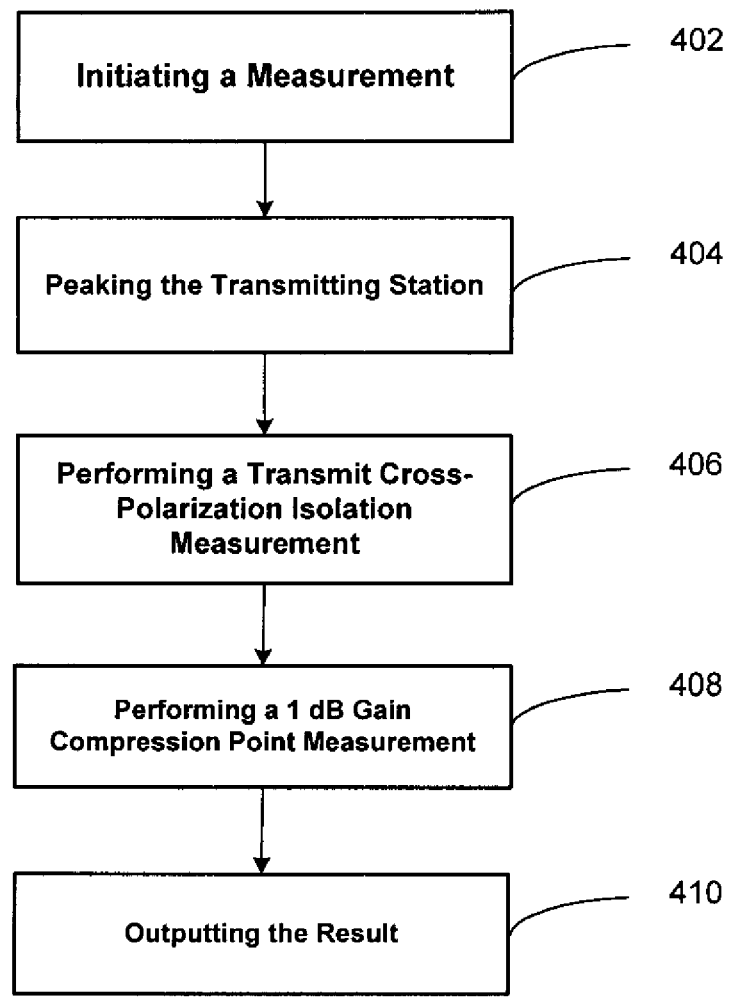
FIG. 4 is an exemplary flowchart illustrating a process of measuring a cross-polarization value and a 1 dB gain compression point at an earth station under test (EUT), according to an exemplary embodiment.

FIG. 4 illustrates a flow diagram of a method for performing a cross-polarization isolation measurement and/or 1 dB gain compression point of a transmitting earth station 110, in accordance with exemplary embodiments. This exemplary method 400 is provided by way of example, as there are a variety of ways to carry out the method. The method 400 shown in FIG. 4 can be executed or otherwise performed by one or a combination of various systems. The method 400 is described below may be carried out by system 100 shown in FIGS. 1-3 by way of example, and various elements of the system 100 are referenced in explaining the example method of FIG. 4. Each block shown in FIG. 4 represents one or more processes, methods or subroutines carried in exemplary method 400. Referring to FIG. 4, exemplary method 400 may begin at block 402.

At block 402, a user may initiate a measurement of a cross-polarization isolation value and/or a 1 dB compression point of a transmitting earth station 110. For example, a user at a monitoring earth station 130 may initiate a cross-polarization isolation measurement by selecting a pair of spectrum analyzer 303 and/or a test channel from a list of test channels via a user interface 311. The list of test channels may be predetermined by the monitoring earth station 130 and/or determined by the user. The user may also select one or more transponders associated with a satellite system 120 based at least in part on the transmitting frequency selected by the user to determine the cross-polarization isolation value and/or the 1 dB gain compression point. The selected spectrum analyzer 303 pair may be automatically configured to measure at a default channel. The default channel may be predetermined by the user and/or may be the first channel in the channel list. Also, the user may select a new test channel and/or frequency from the test channel list. The spectrum analyzers 303 may be automatically configured to perform the measurement at the newly selected test channel. The user may also adjust setting on the spectrum analyzers 303. For example, the user may adjust a frequency control, a reference level control, a span control, a resolution bandwidth control, a video bandwidth control, an attenuation control associated and/or other settings associated with the spectrum analyzer 303. After initiating a measurement of a cross-polarization isolation value and/or 1 dB compression point, the method 400 may proceed to block 404.

At block 404, a field dispatcher may peak and/or optimize the transmission/reception of an antenna located at the transmitting earth station 110. For example, the spectrum analyzers 303 may not be configured to proper settings for satisfactorily peak and/or optimize the transmission/reception of the antenna. The user at the monitoring earth station 130 may utilize adjustment controls associated with the spectrum analyzer 303 to optimize the spectrum analyzer settings. The field dispatcher may configure the transmitting power of the transmitting earth station 110 to a predetermined value. For example, the user at the transmitting earth station 110 may configure the transmitting power having a predetermined transmitted co-polarization carrier to noise (C/N) value with a predetermined resolution bandwidth may be received by the spectrum analyzers 303 at the monitoring earth station 130. Finding the maximum signal level may be accomplished by an iterative process of moving the antenna in the azimuth axis and the elevation axis, and alternating between the axes each time a new peak value may be found.

Also at block 404, to achieve a maximum level, the field dispatcher may adjust the antenna located at the transmitting earth station 110 in the azimuth (east or west) axis in small increments and monitor the signal level on the spectrum analyzer 303 located at the monitoring earth station 130. The field dispatcher may continue to adjust the antenna until the signal level starts to decrease. Thereafter, the field dispatcher may begin moving the antenna in the opposite direction, until the signal level may begin to increase again. Once the signal level may be maximized, the field dispatcher may stop adjusting the antenna and tighten the azimuth screws. Thereafter, the field dispatcher may begin adjusting the antenna in the elevation (up or down) axis. Also, the field dispatcher may adjust the antenna in the elevation axis until the maximum signal may be achieved. This process of adjusting the antenna in the azimuth axis and/or the elevation axis may be repeated, starting again with the azimuth axis, and/or the elevation axis until the signal strength displayed on the spectrum analyzer 303 may be maximized. After peak the antenna located at the transmitting earth station 110, the method 400 may proceed to block 406.

At block 406, after the antenna at the transmitting earth station 110 is peaked, a cross-polarization isolation value may be measured. For example, the spectrum analyzer 303 settings may not be satisfactory for measuring the cross polarization isolation value, the user at the monitoring earth station 130 may configure the spectrum analyzer 303 to optimize the spectrum analyzer 303 settings.

Also at block 406, the cross polarization isolation value may be automatically calculated by the monitoring earth station 130 and displayed on the user interface 311, e.g., computer. As mentioned above, the user may select one or more transponders associated with the satellite system 120 and a pair of spectrum analyzers 303. The selected one or more transponders associated with the satellite system 120 may receive a transmitted signal from the transmitting earth station 110. The transmitted signal may be provided to the selected pair of spectrum analyzers 303 via a signal divider 302. The spectrum analyzer 303 may determine a co-polarization component and/or the cross-polarization component associated with the transmitted signal from the transmitting earth station 110. The cross-polarization isolation value may be determined by taking a ratio of the co-polarization component and the cross-polarization component of the transmitted signal from the transmitting earth station 110. For example, a cross-polarization isolation value of 30 dB or better may be necessary to be compliant with the satellite requirements. Because, the cross-polarization component of the transmitted signal may be small, therefore the transmit cross-polarization component may not display on the spectrum analyzer 303. The field dispatcher may increase the transmitting power at the transmitting earth station 110 until the cross polarization component may be seen on the spectrum analyzer 303. When the cross-polarization component may not be detected, and the co-polarization carrier to noise may be greater than a predetermined value, therefore the cross-polarization isolation value may be adequate.

For example, the measured cross-polarization isolation value may be less than a predetermined value, the field dispatcher may adjust a polarizer associated with the antenna located at the transmitting earth station 110 until the predetermined cross-polarization isolation value or better may be achieved. Also, the predetermined cross-polarization isolation value or better may not be achieved, the user may verify that the antenna at the antenna at the transmitting earth station 110 may be properly peaked. After measuring the cross-polarization isolation value at block 403, the method 400 may proceed to block 408.

At block 408, the 1 dB compression point may be measured. The user at the monitoring earth station 130 may determine that the antenna at the transmitting earth station 110 may be properly peaked as described in block 402 and/or the cross-polarization isolation value may be adequate as described in block 403. The 1 dB compression point may be measured. The field dispatcher may decrease the transmit power of the transmitting earth station 110 so that a predetermined co-polarization carrier to noise (C/N) value may be shown on the spectrum analyzer 303.

Also, at block 408, a user may select 1 dB gain compression point from the monitoring earth system 130 to start the 1 dB compression point test. The monitoring earth system 130 may prompt the user to enter the satellite modems transmit power level setting. The field dispatcher may communicate the current transmit power setting from the modem to the user at the monitoring earth station 130 and may enter this value into the monitoring earth station 130.

As mentioned above, the user may select one or more transponders associated with the satellite system 120 and a pair of spectrum analyzers 303. The selected one or more transponders associated with the satellite system 120 may receive a transmitted signal from the transmitting earth station 110. The transmitted signal may be provided to the selected pair of spectrum analyzers 303 via a signal divider 302. The spectrum analyzers 303 may measure the transmitted signal level from the transmitting earth station 110 and prompt the user located at the monitoring earth station 130 to instruct the field dispatcher at the transmitting earth station 110 to increase the transmitting power by 1 dB. This process may be repeated until the monitoring earth station 130 detected sufficient data to determine the 1 dB compression point. The monitoring earth station 130 may reach the 1 dB gain compression point too fast. Also, the monitoring earth system 130 may determine that there may be a lack of sufficient information to accurately determine the 1 dB gain compression point. The monitoring earth system 130 may prompt the user to instruct the field dispatcher at the transmitting earth station 110 to decrease the transmit power level, e.g., by 12 dB. The monitoring earth system 130 may again begin to instruct the field dispatcher to increase the transmitting power of the transmitting earth station 110 by 1 dB, until the 1 dB compression point may be reached.

Also at block 408, the process of prompting the user located at the monitoring earth station 130 to instruct the field dispatcher at the transmitting earth station 110 to increase the transmitting power by 1 dB may be automated with the user and field dispatcher interaction. For example, the spectrum analyzers 303 may measure the transmitted signal level from the transmitting earth station 110. The monitoring earth station 130 may transmit an instruction signal (e.g., IP multicast signal) based at least in part on the transmitted signal level measurement by the spectrum analyzers 303 to the transmitting earth station 110 via the satellite system 120. The instruction signal transmitted by the monitoring earth station 130 may instruct the transmitting earth station 110 to increase the transmitting power by 1 dB. Also, the instruction signal may be transmitted to a control device (e.g., a computer and/or a processor) that may be integrated and/or associated with the transmitting earth station 110. The control device may instruct the transmitting earth station 110 to increase the transmitting power by 1 dB. This process may be repeated until the monitoring earth station 130 detected sufficient data to determine the 1 dB compression point. After measuring the 1 dB compression point at block 408, the method 400 may proceed to block 410.

At block 410, the determination of the cross-polarization isolation value and/or the 1 dB gain compression point may be outputted for display to the user and/or print out the determination on a report. For example, a user may select to print a report of the cross-polarization isolation value and/or the 1 dB gain compression point. The monitoring earth station 130 may prompt the user to manually enter transmission station information, weather conditions and/or a place to provide additional comments regarding the test. The monitoring earth system 130 may also automatically enter transmission station information and/or weather conditions. Further, the report data may be automatically sent to a centralized database and/or saved e.g., in the users local report history.

Also at block 410, the result of cross-polarization isolation value measurement and/or 1 dB gain compression point measurement may be displayed to a user at the earth monitoring station 130 via a user interface 311. The result of cross-polarization isolation value measurement and/or 1 dB gain compression point measurement may be outputted to the user interface 311 in at about real-time and/or near real-time. For example, the result of cross-polarization isolation value measurement and/or 1 dB gain compression point measurement may be provided to the user interface 311 at about real-time without delay. Also, the result of cross-polarization isolation value measurement and/or 1 dB gain compression point measurement may be outputted to the user interface 311 at predetermined or user-selected intervals. For example, the user may set the update interval to a small value (e.g., 50-250 milliseconds) to achieve a near real-time monitoring of the transmitting earth station 110.

Further at block 410, the result of cross-polarization isolation value measurement and/or 1 dB gain compression point measurement may be provided to the field dispatcher at the transmitting earth station 110 via a wide area network 309. For example, the wide area network 309 may be a satellite network. The result of cross-polarization isolation value measurement and/or 1 dB gain compression point measurement may be transmitted (e.g., IP multicast transmission) by the monitoring earth station 130 to the field dispatcher at the transmitting earth station 110 via a satellite system 120. Also, the result of cross-polarization isolation value measurement and/or 1 dB gain compression point measurement may be transmitted by the monitoring earth station 130 directly to the field dispatcher at the transmitting earth station 110. Therefore, the field dispatcher at the transmitting earth station 110 may obtain the result of cross-polarization isolation value measurement and/or 1 dB gain compression point measurement at about real-time or near real-time as discussed above.

Figure 5:
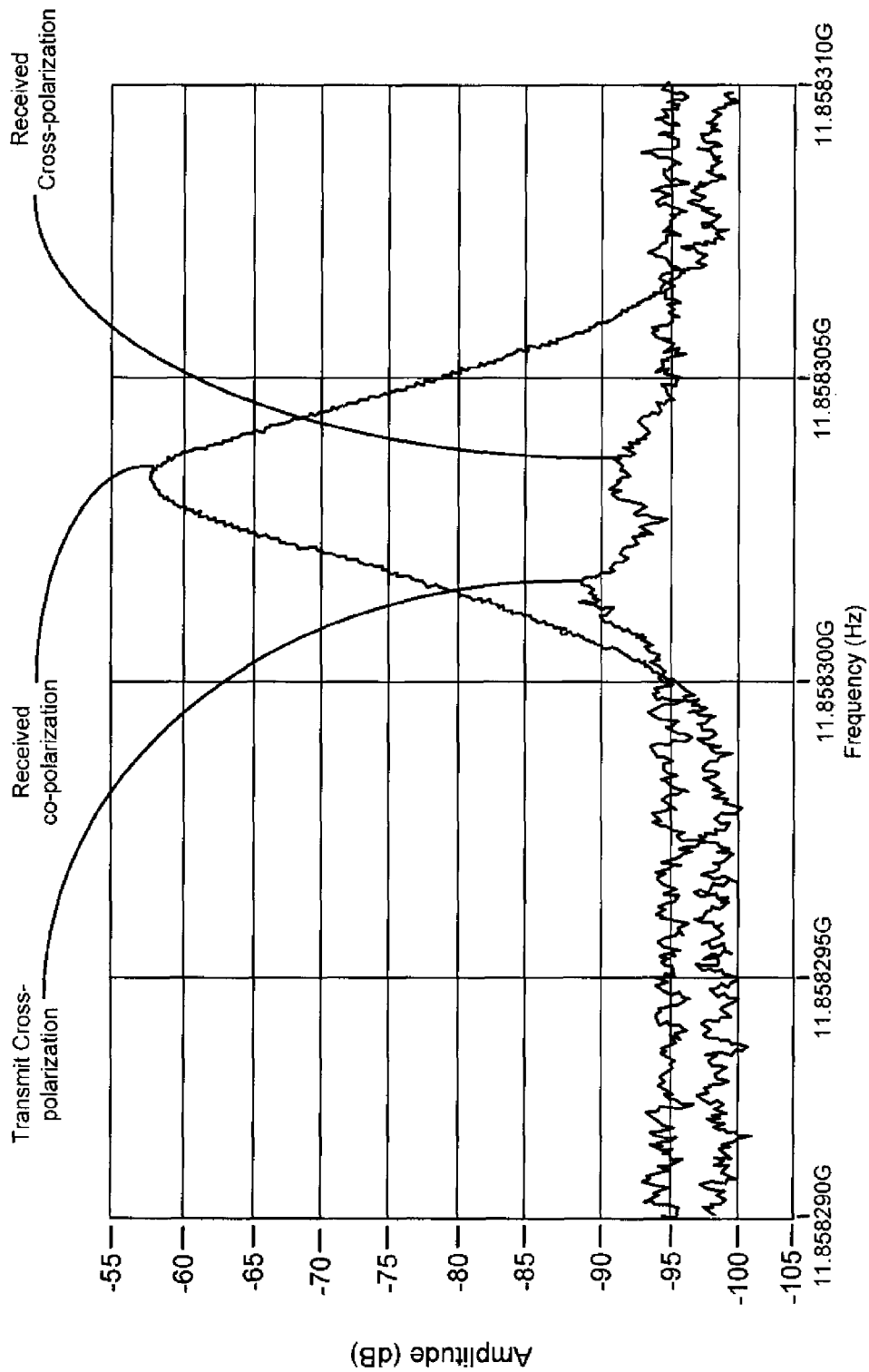
FIG. 5 depicts a graph of received signal for measuring a cross-polarization isolation value at an earth station under test (EUT), according to an exemplary embodiment.

FIG. 5 illustrates a plot of co-polarization component and cross-polarization components of the transmitted signal from the transmitting earth station 110, in accordance with the embodiment of the present disclosure. The receive co-polarization component may be associated with the transmitting signal from the transmitting earth station 110 taking a desired transmission path of 140 and 150 thru the satellite system 120 and/or a transmission path of 160. The receive cross-polarization signal shown in the figure may be due to a non-perfect isolation in a feed system of an antenna 301 located at a monitoring earth station 130. The received co-polarization signal and the received cross-polarization signal may be at the same frequency, due to the synchronizing reference signal fed to a pair of spectrum analyzers 303. By synchronizing the received co-polarization signal and the received cross-polarization signal at the same frequency, the monitoring system may easily eliminate the received cross-polarization signal to determine the transmit cross-polarization isolation value. Also, the transmitted cross-polarization signal may be shown in FIG. 5. The transmitted cross-polarization may be caused by non-perfect isolation of a feed system of an antenna located at a transmitting earth station 110. The transmitted cross-polarization signal may be offset in frequency than the receive co-polarization and/or cross-polarization signals. The offset in frequency may be caused by the transmitted cross-polarization signal may take a path thru a different transponder on the satellite system 120 and/or as a result may have gone thru a different frequency conversion process. The monitoring earth station 130 may measure the ratio of the amplitude of the received co-polarization and the amplitude of the transmitted cross-polarization signal to determine the cross-polarization isolation value.

Figure 6:
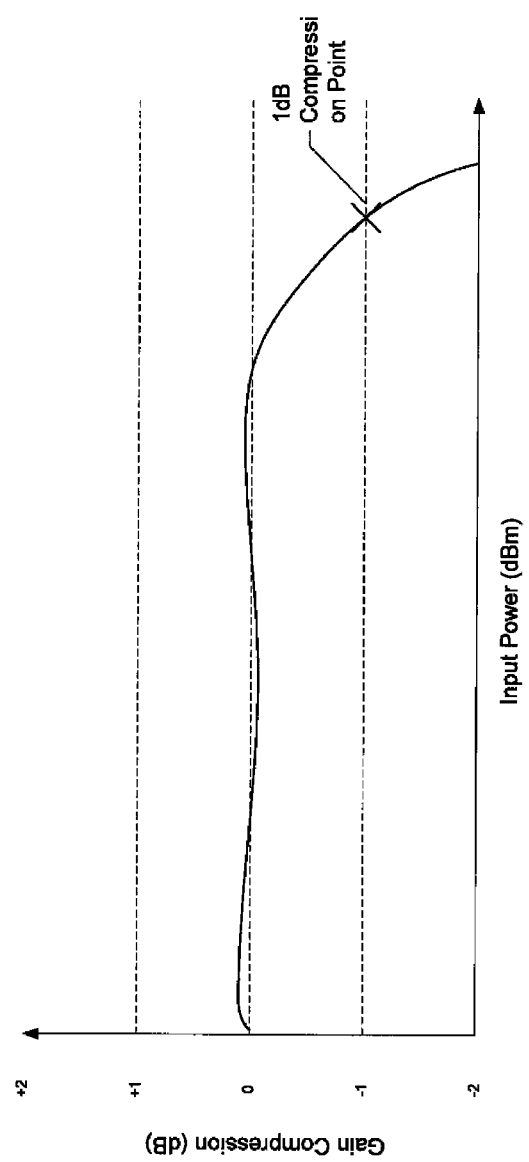
FIG. 6 depicts a graph of received signal measuring a 1 dB gain compression point at an earth station under test (EUT), according to an exemplary embodiment.

FIG. 6 illustrates a plot of 1 dB gain compression point, in accordance with an exemplary embodiment. The 1 dB gain compression point may be determined by measuring received gain at a monitoring earth station 130 at different input power level settings at a transmitting earth station 110. For example, for every 1 dB increase in input power at the transmitting earth station 110, a corresponding 1 dB increase in output power may be detected at the monitoring earth station 130, this region of the plot may be considered a "linear" region. As the output power limit of the transmission system may be reached, the gain detected at the monitoring earth station 130 may start to compress and the plot may become non-linear. Therefore, the 1 dB gain compression point may be reached when the gain is 1 dB less than it was in the linear region.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving a signal at a monitoring station;
   detecting the signal by one or more spectrum analyzers;
   dividing a reference signal to the one or more spectrum analyzers;
   determining a 1 dB gain compression point based at least in part on the signal; and
   updating and outputting at about real-time the determination of the 1 dB gain compression point for display to a user.

2. The method of claim 1, wherein the signal is transmitted by a transmission station.

3. The method of claim 2, wherein the monitoring station and the transmission station are disposed at two distinct locations.

4. The method of claim 2, further comprising optimizing transmission/reception of an antenna located at the transmission station.

5. The method of claim 4, wherein optimizing transmission/reception of an antenna located at the transmission station comprises adjusting an azimuth axis of the antenna located at the transmission station.

6. The method of claim 4, wherein optimizing transmission/reception of an antenna located at the transmission station comprises adjusting an elevation axis of the antenna located at the transmission station.

7. The method of claim 1, wherein determining the 1 dB gain compression point comprises increasing an input power associated with the transmission station.

8. The method of claim 7, wherein the input power associated with the transmission station is increased by 1 dB.

9. The method of claim 7, wherein determining the 1 dB gain compression point further comprises increasing the input power associated with the transmission station until a non-linear output is reached.

10. A non-transitory computer readable media comprising code to perform the acts of the method of claim 1.

11. A system, comprising:
    an antenna configured to receive a signal at a monitoring station;
    one or more spectrum analyzers configured to detect the signal;
    one or more first signal dividers configured to divide a reference signal to the one or more spectrum analyzers;

a processing module comprising at least one computer processor configured to determine a 1 dB gain compression point based at least in part on the signal; and a user interface configured to update and output the determination of the 1 dB gain compression point for display to a user.

12. The system of claim 11, wherein the one or more spectrum analyzers comprise one or more pairs of spectrum analyzers.

13. The system of claim 12, wherein the one or more pairs of spectrum analyzers are synchronized with a reference signal.

14. The system of claim 11, wherein the one or more first signal dividers are further configured to divide the reference signal from at least one of the one or more spectrum analyzers and provide the divided reference signal to the one or more spectrum analyzers.

15. The system of claim 11, further comprises one or more second signal dividers configured to replicate an output signal of the antenna and input the replicated output signal of the antenna to the one or more spectrum analyzers.

16. The system of claim 15, wherein the one or more second signal dividers comprise a number of channels based at least in part on a number of the one or more spectrum analyzers.

17. The system of claim 11, further comprising one or more signal converters configured to convert a serial input signal to an Ethernet output signal.

18. The system of claim 17, further comprising a switch configured to receive the Ethernet output signal from the one or more signal converters.

19. The system of claim 11, wherein the antenna comprises one or more polarizers.

* * * * *